United States Patent
Du Quesne

(10) Patent No.: US 7,431,066 B2
(45) Date of Patent: Oct. 7, 2008

(54) AUXILIARY TOOL FOR PUTTING A TIRE ON A RIM

(76) Inventor: Bertrand Du Quesne, Milcampslaan 223, Brussels (BE) 1030

( * ) Notice: Subject to any disclaimer, the term of this patent is extended or adjusted under 35 U.S.C. 154(b) by 0 days.

(21) Appl. No.: 11/546,245

(22) Filed: Oct. 12, 2006

(65) Prior Publication Data
US 2007/0079940 A1    Apr. 12, 2007

(30) Foreign Application Priority Data
Oct. 12, 2005    (BE) .................. 2005/0501

(51) Int. Cl.
  *B60C 25/04*    (2006.01)
  *B60C 25/12*    (2006.01)
(52) U.S. Cl. ........................... 157/1.3; 157/1
(58) Field of Classification Search ............ 157/1, 157/1.17, 1.3, 5; 81/15.2; 7/100
See application file for complete search history.

(56) References Cited

U.S. PATENT DOCUMENTS

| | | | | |
|---|---|---|---|---|
| 840,938 A * | 1/1907 | Heller et al. | ............... | 157/1.17 |
| 1,431,097 A * | 10/1922 | Carroll | ............... | 152/185 |
| 1,689,585 A * | 10/1928 | Haschart | ............... | 81/125.1 |
| 2,925,857 A * | 2/1960 | Twiford | ............... | 157/1 |
| 3,771,581 A * | 11/1973 | Johnson | ............... | 157/1.22 |
| 4,462,451 A * | 7/1984 | Ogren | ............... | 157/1.17 |
| 6,237,666 B1 * | 5/2001 | Magnani | ............... | 157/1.3 |
| 2006/0196610 A1 * | 9/2006 | Brahler, II | ............... | 157/1.17 |

* cited by examiner

*Primary Examiner*—David B Thomas
(74) *Attorney, Agent, or Firm*—Bacon & Thomas, PLLC

(57) ABSTRACT

An auxiliary tool for putting a tire (8) on a rim (9), in particular for keeping a bead (16) of the tire (8) above the outer edge (15) of the rim (9) and for driving this bead (16) in the recess of the rim (9), wherein this auxiliary tool comprises a body in the shape of a fork or in the shape of a comb, comprising at least two teeth (3).

14 Claims, 7 Drawing Sheets

AUXILIARY TOOL FOR PUTTING A TIRE ON A RIM

BACKGROUND OF THE INVENTION

1. Field of the Invention

The present invention concerns an auxiliary tool for putting a tire on a rim, for example the wheel of a car, a truck or any other vehicle.

2. Discussion of the Related Art

It is known that, in order to put a tire on a rim, a machine is generally used designed to that effect, as described for example in European patent No. 0,909,667, whereby the rim is fixed first, after which the tire is put on it by means of a lever which pushes the tire down while the rim is being rotated round its axis, such that the bead of the tire is pulled over the outer edge of the rim, and said bead is thus driven in the recess of the rim.

Although such a type of machine is very useful for putting on a conventional tire, problems arise when fitting what are called low profile tires or run-flat tires, i.e. having bearing flanks.

Indeed, the flanks of this type of tire are reinforced, such that, in order to drive in the bead of the tire in the recess of the rim, when putting on the tire, much force is required, such that said tire is locally deformed through the action of the above-mentioned lever, which may lead to damages of the tire and/or the rim.

The above-mentioned machine was initially not designed for putting on this type of reinforced tires.

That is why, in many cases, tire fitters use additional levers or accessories that are fixed to the rim, for example.

In all these cases, putting on low-profile tires or run-flat tires remains difficult and requires craftsmanship and dexterity from the fitter.

The risk of damaging the tire and the rim, due to local tensions, is certain.

Special mechanisms have been invented for putting on this type of reinforced tires, and they have been applied as accessories on the above-mentioned machine, mechanisms that make use for example of guides and hydraulic cylinders or extra tires.

These mechanisms are inconvenient, however, in that they are relatively complex and expensive.

SUMMARY OF THE INVENTION

The invention aims an auxiliary tool which, when putting a tire on a rim by means of an above-mentioned tire fitting machine, more specifically a low-profile tire or a run-flat tire, excludes one or several of the above-mentioned disadvantages and which moreover has a very simple design and is easy to operate, without requiring any particular dexterity of the fitter.

To this end, the invention concerns an auxiliary tool for putting a tire on a rim, mainly formed of a body in the shape of a fork or a comb, comprising at least two teeth.

When putting the tire on the rim, the auxiliary tool according to the invention is first manually placed on the bead of the tire, and the free ends of its teeth are pushed under the outer edge of the rim, which lightly compresses the flank of said tire; next, the tire is fit according to the known procedures, using a known machine to that end, whereby the auxiliary tool, as it is pinched between the bead of the tire and the edge of the rim, rotates together with the rim and with the tire, drives in the bead of the tire to the bottom at the place occupied by one of the external teeth of the auxiliary tool, such that the tire puts itself on so to say.

According to a preferred embodiment, the auxiliary tool is provided with three teeth, whereby the middle tooth is shorter than the outer teeth and the free ends of the teeth are situated on a perimeter whose radius is in the order of magnitude of the radius of the perimeter of the rim on which the tire is to be fit, whereby one of the teeth, preferably the middle tooth, forms an angle with the plane formed by the other two teeth.

An advantage connected to this embodiment is that the auxiliary tool stays automatically in place, while the tire is being fit, such that the intervention of the fitter is very restricted, if not to say superfluous.

BRIEF DESCRIPTION OF THE DRAWINGS

In order to better explain the characteristics of the invention, the following preferred embodiments of an auxiliary tool according to the invention for putting a tire on a rim are given as examples only without being limitative in any way, with reference to the accompanying drawings, in which.

DESCRIPTION OF THE PREFERED EMBODIMENTS

Figure 1:
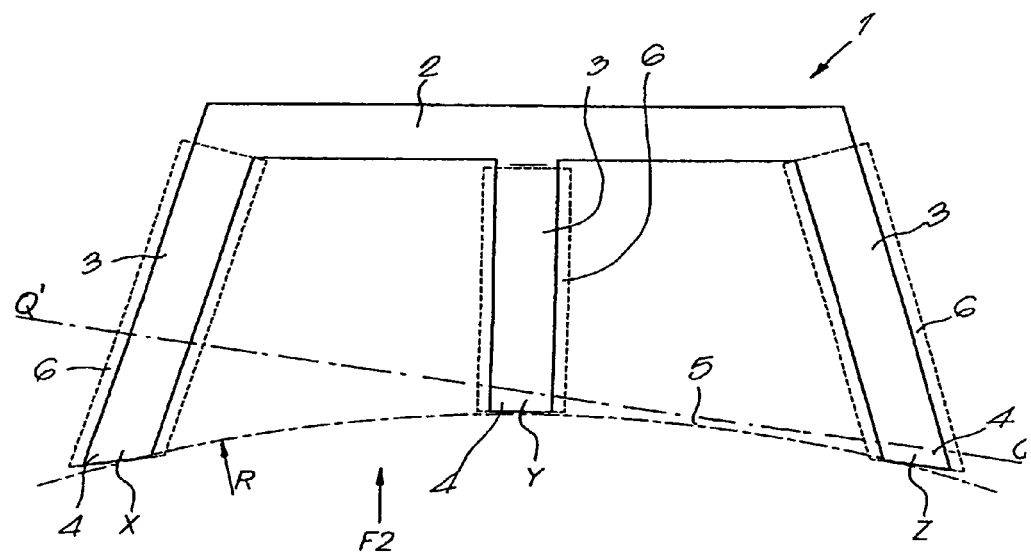
FIG. 1 is a view from above on an auxiliary tool according to the invention.
Figure 2:
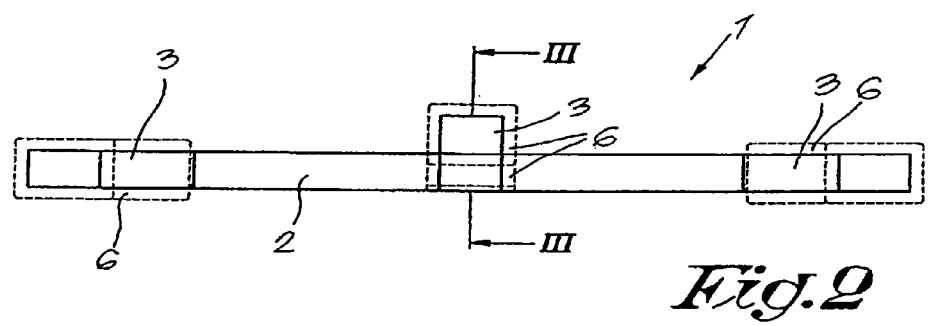
FIG. 2 represents a view according to arrow F2 in FIG. 1.
Figure 3:
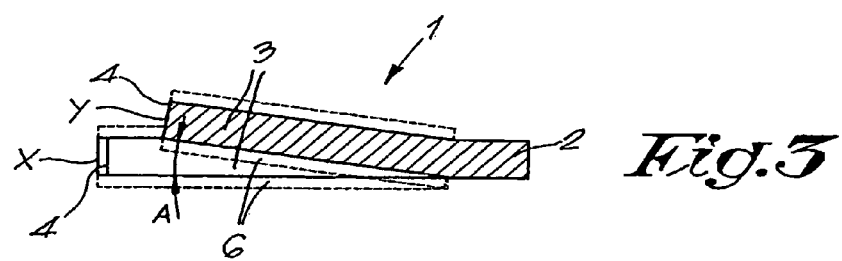
FIG. 3 is a cross section according to line III-III in FIG. 2.

In FIGS. 1 to 3 is represented an auxiliary tool 1, more specifically a manual tool, according to the invention which, in this case, is realized in the form of a comb comprising a base 2 and three teeth 3, provided crosswise on said base, whereby the middle tooth 3 is provided at right angles to the base 2, whereas the outer teeth 3 are inserted slantingly in the base 2 and form an angle with the middle tooth 3, such that the outer teeth 3 diverge from each other and thus have diverging free ends 4.

However, it is not excluded to provide parallel teeth in an embodiment which is given as a variant.

In the given example, the middle tooth 3 is shorter than the outer teeth 3 and the free ends 4 of the teeth 3 are situated on an imaginary perimeter 5 whose radius R is in the order of magnitude of the average radius of the rim on which the tire is to be fit, such that the auxiliary tool 1 can be used for tires and rims of different dimensions.

The distance of the free ends 4 of the teeth 3 covers a significant part of the perimeter 5, for example a part which corresponds to a circle segment of 50°.

The free end of one of the teeth 3 is preferably situated outside the plane which is formed by the other two teeth 3.

In the given example, we owe this characteristic to the fact that the middle tooth 3 is directed towards the top and forms an angle A with the above-mentioned plane of the other teeth 3; this characteristic may also be owed to the fact that the tooth 3 concerned is made thicker than the other teeth 3.

In a variant, the free end 4 of an outer tooth 3 may for example protrude towards the top or towards the bottom in relation to the far ends of the other teeth 3.

The teeth 3 of the auxiliary tool 1 are provided, as a whole or partly, with a protective coating made of rubber or the like. It is not excluded to provide the auxiliary tool 1 as a whole with a protective coating of this sort.

Figure 4:
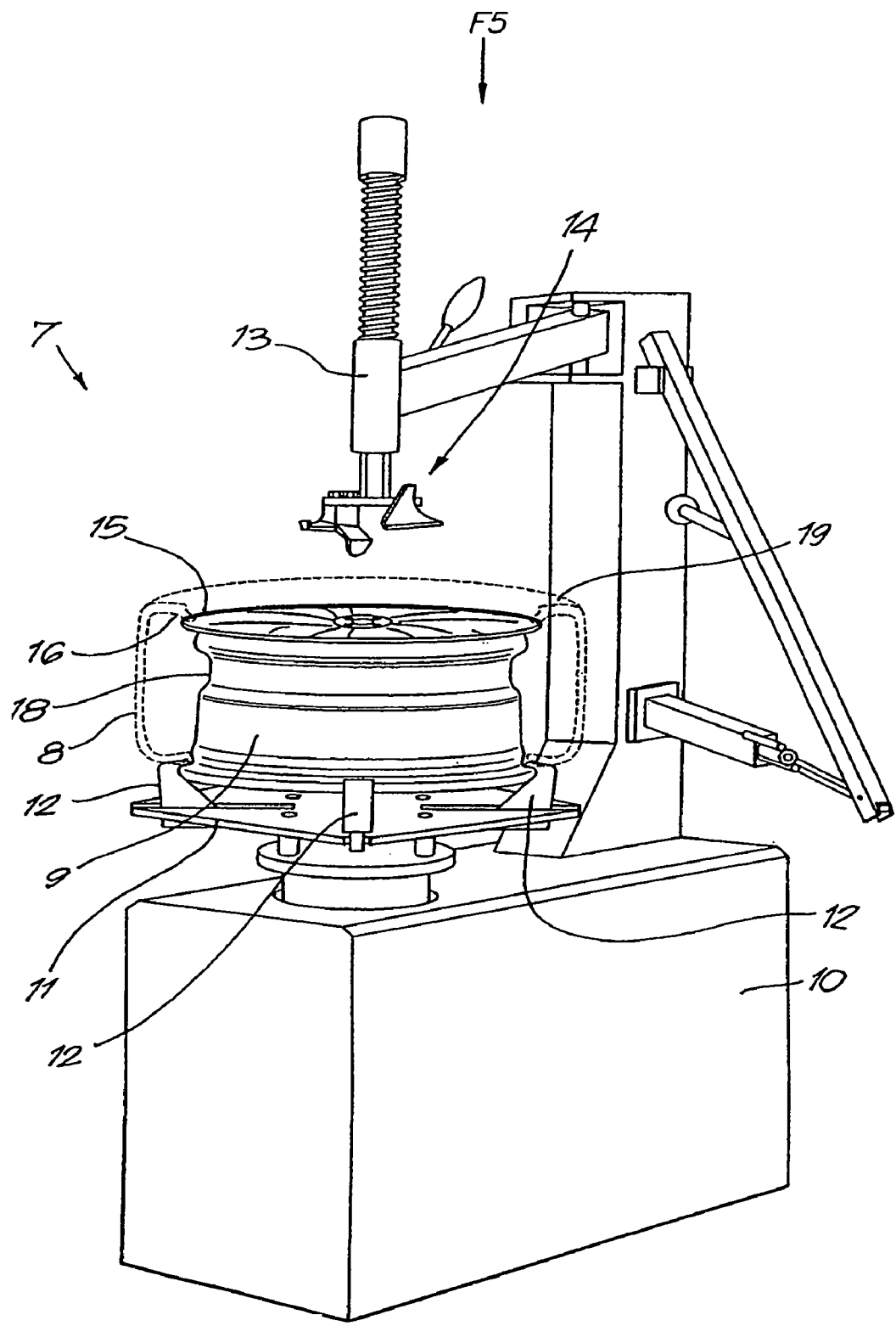
FIG. 4 represents an existing machine for putting a tire on a rim.

The auxiliary tool 1 is designed to be used in combination with an existing machine 7, for example as described in document EP 0,909,667 and as represented in FIG. 4, for fitting a tire 8 on a rim 9, in particular when the tire 8 to be fit is of the low-profile type or a run-flat tire, i.e. having reinforced bearing flanks.

Without entering into details, a machine for fitting tires 7 of this type is mainly formed of a frame 10; of a rotating table 11 placed on this frame 10, provided with clips 12 with which the rim 9 is fixed to the rotating table 11; of a column 13 which carries a tool 14 which can be placed close to the outer upper edge 15 of the rim 9.

In order to put a tire 8 on a rim 9, it is first fixed to the rotating table 11, after which, in a known manner, the tire 8 is pulled with its lower bead 16 over the outer upper edge 15 of the rim 9, as is represented in FIG. 4, which can be done without the auxiliary tool 1.

Figure 5:
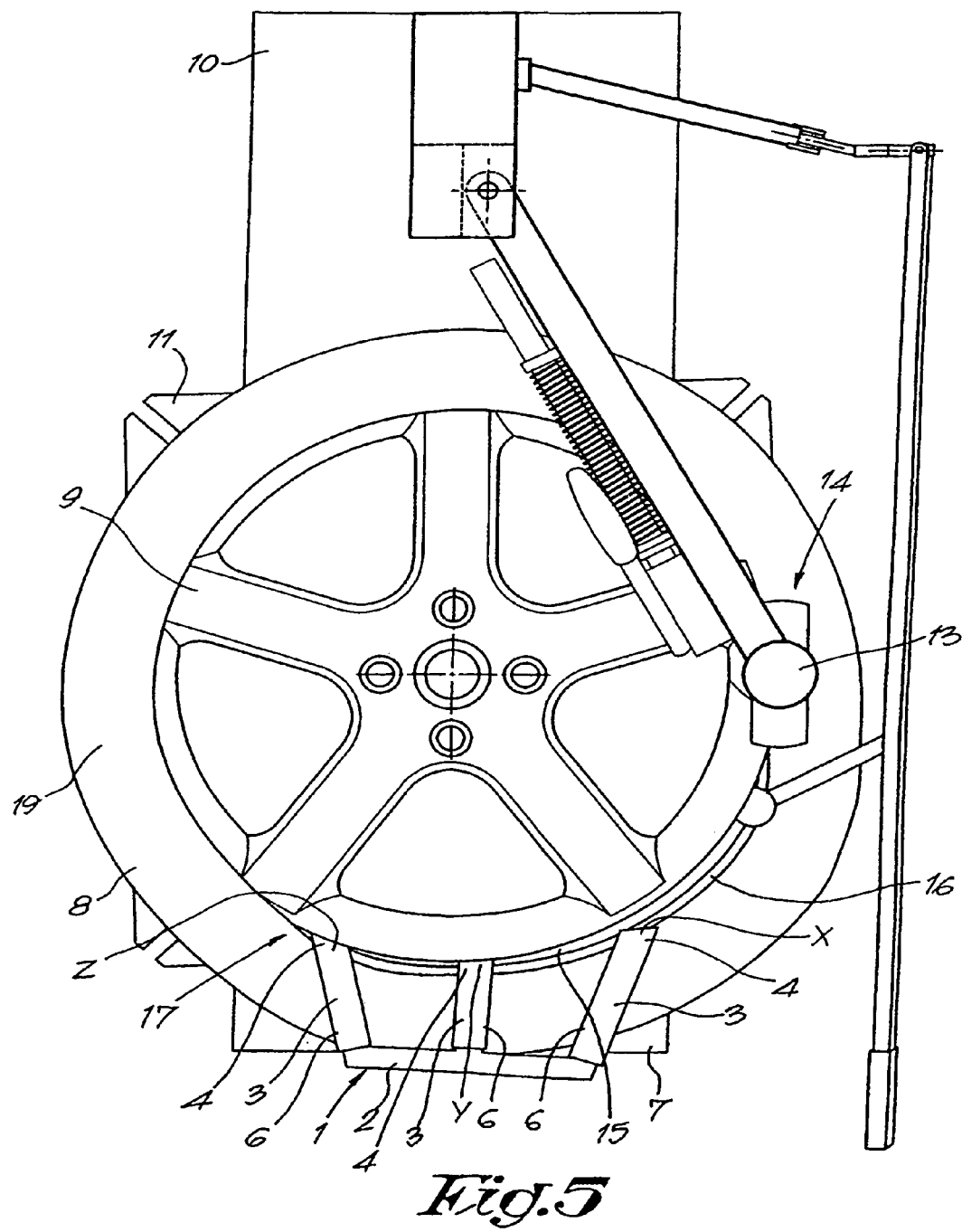
FIG. 5 represents a view from above according to arrow F5 of FIG. 4, in which an auxiliary tool according to the invention is adapted while putting a tire on a rim.
Figure 6:
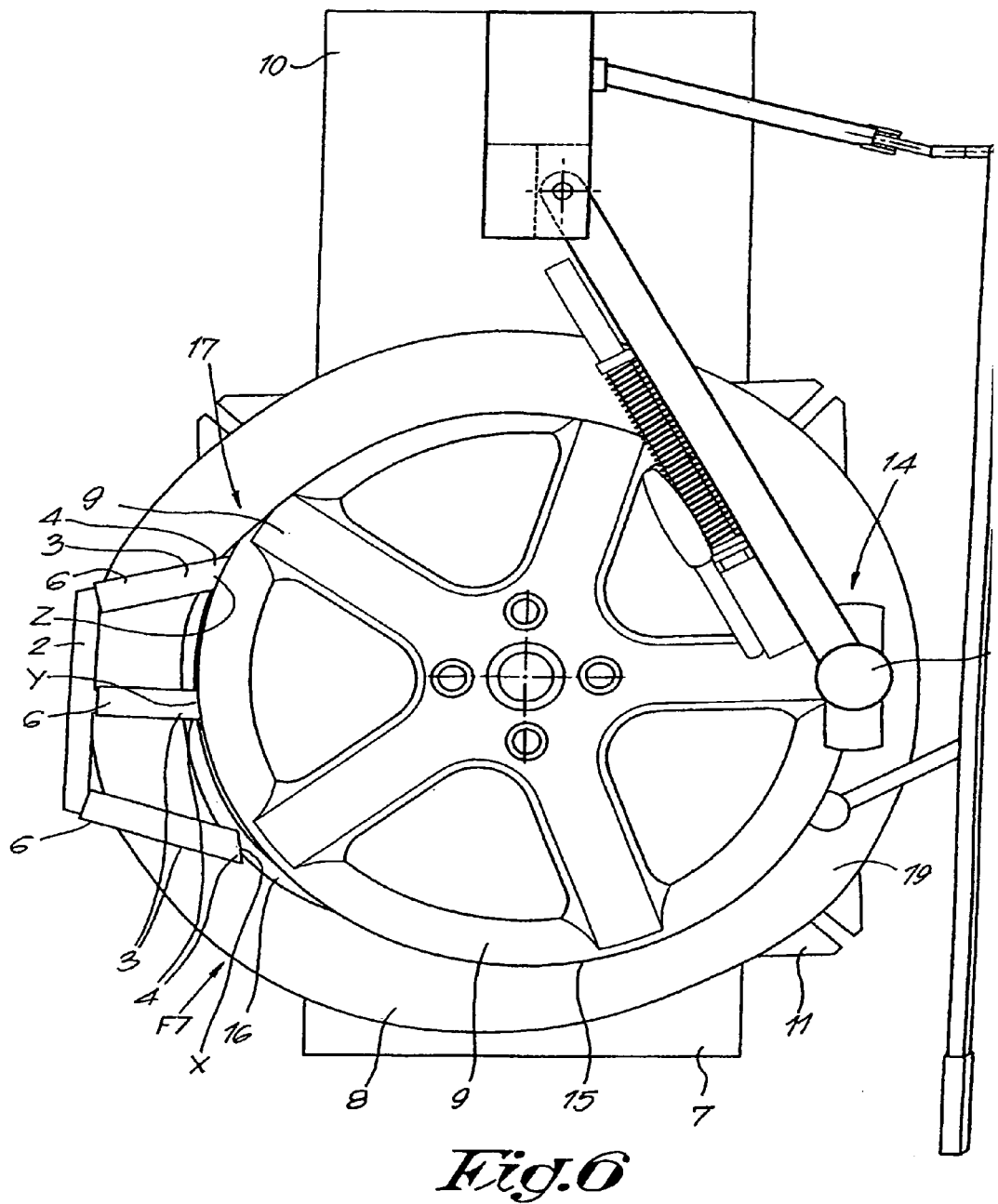
FIG. 6 represents a view analogous to that in FIG. 5, but for another phase during the fitting of the tire on the rim.

Next, to further fit the upper bead of the tire 8 on the rim 9, use is made of the auxiliary tool 1 according to the invention, as is illustrated with reference to FIGS. 5 to 7.

First of all, the tools 14 of the machine for fitting the tire 7 are fitted in a manner known to the craftsman.

Next, the auxiliary tool 1 is placed on the upper bead 16 of the tire and this bead 16 is manually pushed down with the auxiliary tool 1 so as to simultaneously push the auxiliary tool 1 with the free ends 4 of its teeth 3 between the flank 19 of the tire 8 and the outer upper edge 15 of the rim.

After the tire 8 and the auxiliary tool 1 have been released, the bead 16 of the tire 8 unbends in an elastical manner, such that the auxiliary tool 1 is squeezed between the bead 16 of the tire 8 and the outer edge 15 of the rim 9, such that, first of all the outer left tooth 3, on the place 17 where the bead 16 of the tire 8 extends in a slanting manner over the outer edge 15, is held between the bead 16 of the tire 8 and the rim 9.

Figure 7:
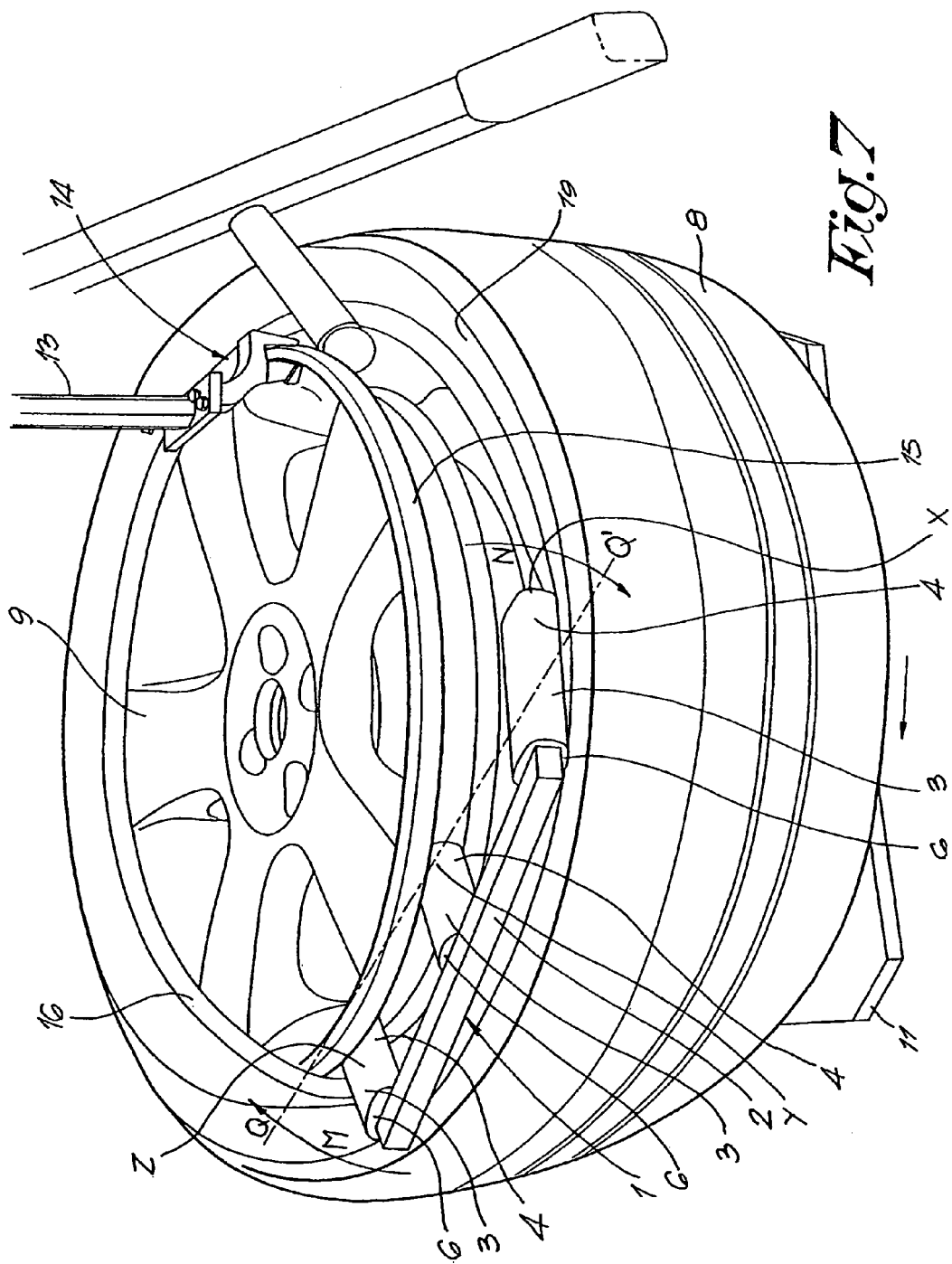
FIG. 7 is a view in perspective according to arrow F7 in FIG. 6.

Thanks to the upward directed elastic force M, exerted by the tire 8 as indicated in FIG. 7, the auxiliary tool 1 is pushed up, more on the left than on the right side, as the tire 8 extends upward in a slanting manner on its left side. Said force exerted by the tire 8 on the auxiliary tool 1 creates a moment round the axis Q-Q' which couples the free end 4 of the left tooth 3 with the free end 4 of the middle tooth 3.

Thus, the auxiliary tool 1 rocks so to say round said axis Q-Q' and round the middle tooth 3 which serves as a supporting point, such that the free end 4 of the right tooth 3 rocks to the bottom, as the far end 4 is situated on the other side of the axis Q-Q' in relation to the force M exerted by the tire 8 on the tool 1.

Consequently, the free end 4 of the right tooth 3 exerts a force N on the bead 16 of the tire 8 as indicated in FIG. 7 and drives the bead 16 of the tire 8 down there so as to reach the recess 18 of the rim 9.

Note that the force N exerted on the bead 16 of the tire 8 by the far end 4 of the right tooth 3 is in proportion to the elastic force M of the tire 8 on the tool 1 and thus in proportion to the elastic resistance of the tire 8.

As soon as the auxiliary tool 1 has been put in place in the above-mentioned manner, the fitting may continue in the known manner, such that the machine 7 is driven and the bead 16, through the rotation of the rim 9, is pulled further over the outer edge 15 of the rim 9.

In this case, the auxiliary tool 1 is kept in place as the left tooth 3 is firmly held between the bead of the tire 8 and the rim 9.

As the middle tooth 3 is shorter than the outer teeth 3, the rising forces exerted by the tire 8 on the far ends 4 of the outer teeth 3 make sure that a moment of force is obtained round the supporting point which is formed by the far end 4 of the middle tooth 3, a moment of force which pushes the auxiliary tool 1 against the flank 19.

Thanks to the auxiliary tool 1, the fitting further continues automatically without any human intervention.

From what precedes, it is clear that the far ends 4 of the teeth 3 serve as supporting points X, Y, Z, whereby the supporting point Z serves to clamp the auxiliary tool 1, whereas the supporting point X serves as a compression spot to push the bead 16 of the tire 8 into the recess of the rim 18.

Figure 8:
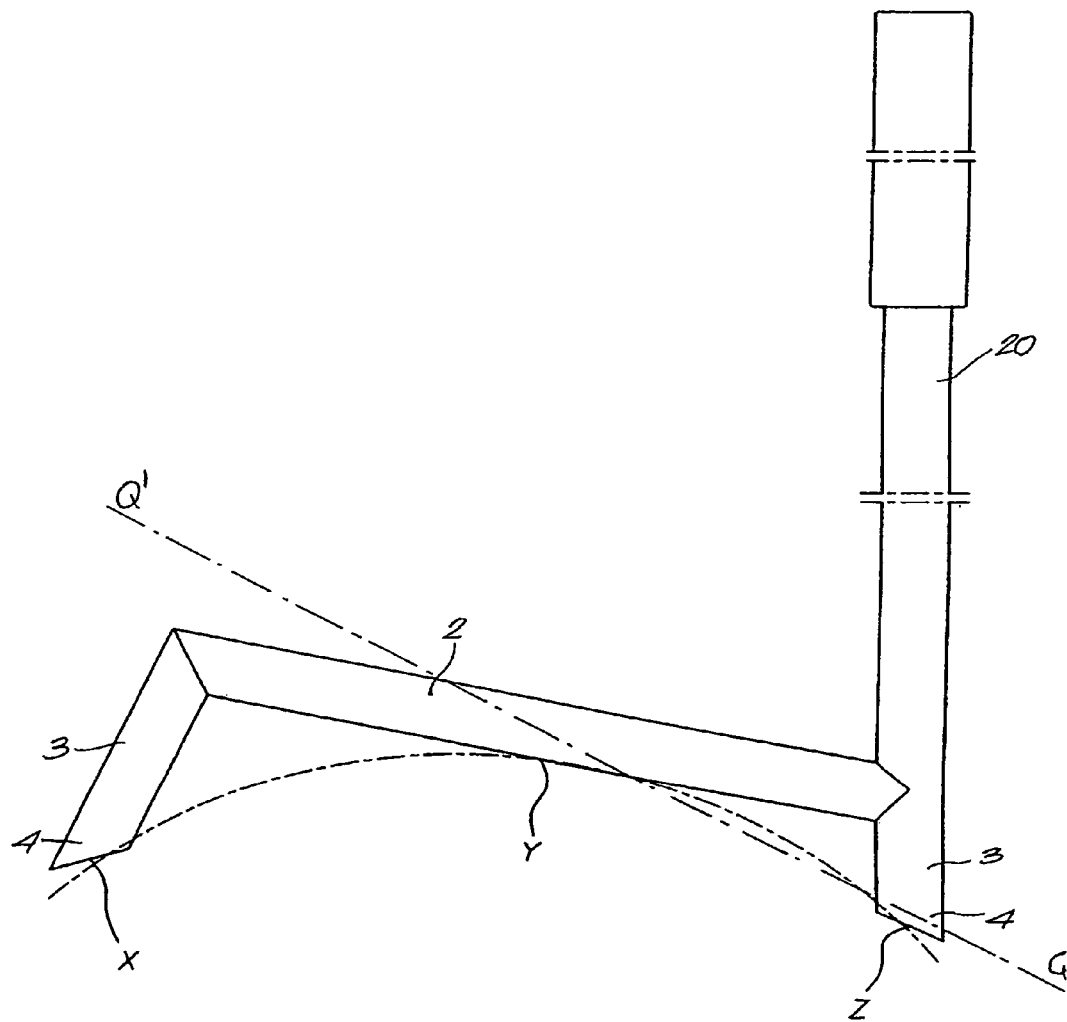
FIGS. 8 and 9 represent, in a view from above, two possible variants of an auxiliary tool according to the invention.

FIG. 8. represents a variant of an auxiliary tool 1 according to the invention which, in this case, is realized in the shape of a fork comprising a handle 20 and two teeth 3.

The supporting points X, Y, Z are in this case formed of the far ends 4 of the teeth 3 and of a central supporting point Y on the base 2 respectively, which can be considered, in theory, as a far end of a tooth having no length.

Figure 9:
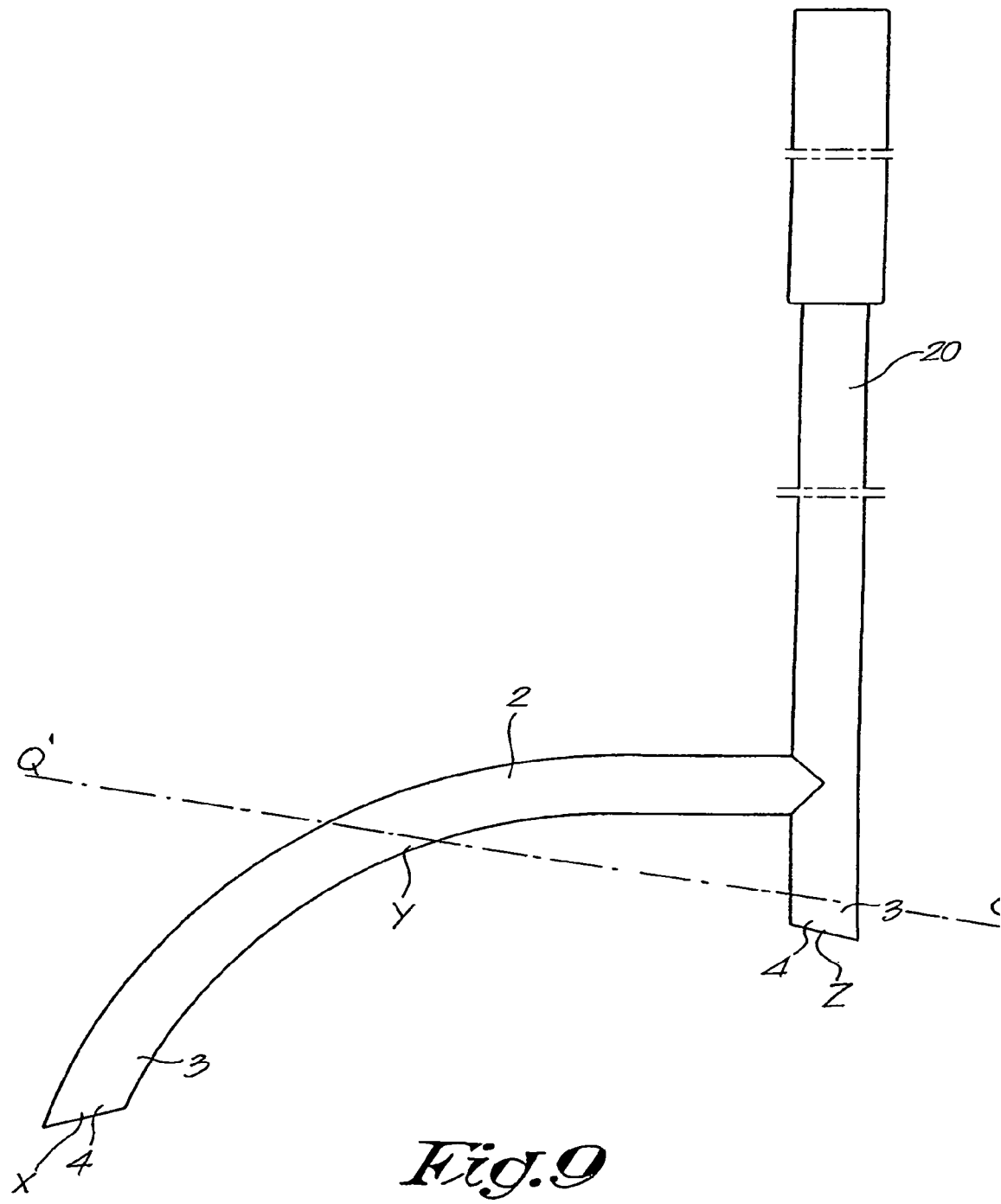

FIG. 9 represents another variant of an auxiliary tool 1 according to the invention, which is realized in a manner analogous to that of FIG. 8, but in which a tooth 3 has a curved shape which corresponds to that of a circle segment whose radius R is in the order of magnitude of the diameter of the rim 9.

It is clear that the auxiliary tool 1 can, if necessary, be part of the machine for fitting tires 7 by fixing the auxiliary tool 1 to it in one way or another.

The present invention is by no means restricted to the above-described embodiments, given by way of example and represented in the accompanying drawings; on the contrary, an auxiliary tool according to the invention for putting a tire on a rim can be realized in many other shapes and dimensions while still remaining within the scope of the invention.

The invention claimed is:

1. An auxiliary tool for putting a tire on a rim, wherein a bead of the tire is kept above the outer edge of the rim and the bead is driven in the recess of the rim, comprising:
   a body, in the shape of a fork or in the shape of a comb, having three teeth, such that, in use, free ends of the teeth of the tool are positioned between a flank of the tire and an outer edge of the rim.

2. The auxiliary tool according to claim 1, wherein the auxiliary tool includes a handle.

3. The auxiliary tool according to claim 1, wherein a far end of an outer tooth is situated on the other side of an axis which connects the free end of the other outer tooth to the free end of the middle tooth in relation to a force exerted by the tire on the tool.

4. The auxiliary tool according to claim 1, wherein, in comparison with the free end of the middle tooth, the far end of an outer tooth is situated in a position which is more or less diametrically opposed to the point where the force exerted by the tire on the tool is applied.

5. The auxiliary tool according to claim 1, wherein the middle tooth is shorter than the outer teeth.

6. The auxiliary tool according to claim 1, wherein the free ends of the teeth are situated on an imaginary perimeter whose radius is in the order of magnitude of the radius of the perimeter of the rim on which the tire is to be fit.

7. The auxiliary tool according to claim 1, wherein the free end of one of the teeth is situated outside a plane including the other two teeth.

8. The auxiliary tool according to claim 1, wherein one of the teeth forms an angle with a plane including the other teeth.

9. The auxiliary tool according to claim 1, wherein the outer teeth diverge.

10. The auxiliary tool according to claim 1, wherein one of the outer teeth has a curved form corresponding to that of a segment of a circle whose radius is in the order of magnitude of the radius of the rim on which the tire is to be fit.

11. The auxiliary tool according to claim 1, wherein the teeth are provided, at least partly, with a protective coating made of rubber or the like.

12. The auxiliary tool according to claim 1, wherein said auxiliary tool is a manually operated auxiliary tool.

13. An auxiliary tool for putting a tire on a rim, comprising a mainly flat part which is provided with three supporting points which are situated on an imaginary perimeter whose radius is in the order of magnitude of the radius of the rim on which the tire is to be fit, and wherein one of the supporting points is situated outside the above-mentioned flat part.

14. An auxiliary tool for putting a tire on a rim, wherein a bead of the tire is kept above the outer edge of the rim and the bead is driven in the recess of the rim, comprising:

a body, in the shape of a fork or in the shape of a comb, having at least two teeth, wherein one of the outer teeth has a curved form corresponding to that of a segment of a circle whose radius is in the order of magnitude of the radius of the rim on which the tire is to be fit.

* * * * *